United States Patent [19]

Kinugasa et al.

[11] Patent Number: 5,043,817
[45] Date of Patent: Aug. 27, 1991

[54] IMAGE PICK-UP APPARATUS WITH ELECTRONIC ZOOMING-IN

[75] Inventors: Toshiro Kinugasa, Hiratsuka; Tokuya Imaide, Yokohama, both of Japan

[73] Assignee: Hitachi, Ltd., Tokyo, Japan

[21] Appl. No.: 454,721

[22] Filed: Dec. 21, 1989

[30] Foreign Application Priority Data

Dec. 23, 1988 [JP] Japan .................. 63-323287

[51] Int. Cl.⁵ .................................. H04N 5/335
[52] U.S. Cl. .................. 358/213.13; 358/213.22; 358/213.29; 358/209
[58] Field of Search ............... 358/140, 180, 213.13, 358/213.11, 225, 909, 209, 213.19, 213.26, 213.22, 213.29, 41, 44, 209

[56] References Cited

U.S. PATENT DOCUMENTS

| | | | |
|---|---|---|---|
| 4,603,355 | 7/1986 | Yamada et al. | 358/213.13 |
| 4,710,803 | 12/1987 | Suzuki et al. | 358/41 |
| 4,843,475 | 6/1989 | Imai | 358/180 |
| 4,891,702 | 1/1990 | Nakajama | 358/180 |
| 4,910,599 | 3/1990 | Hashimoto | 358/180 |
| 4,924,316 | 5/1990 | Kobayashi et al. | 358/44 |

FOREIGN PATENT DOCUMENTS 62-291269  11/1986  Japan .

*Primary Examiner*—Howard W. Britton
*Assistant Examiner*—Tuan V. Ho
*Attorney, Agent, or Firm*—Antonelli, Terry, Stout & Evans

[57] ABSTRACT

To read out signals from a solid-state image sensor having a plurality of photodiodes arranged in a two dimensional form, there are provided a first driving circuit for generating a driving pulse group for a normal readout operation, and a second driving circuit for producing a driving pulse group for an electronic zooming-in imaging operation as a driving circuit for generating a pulse group by which the solid-state image element is driven. When the solid-state image sensor is driven by the pulse group supplied from the first driving circuit, the signals of the photodiodes of two rows adjacent to each other in a vertical direction are mixed with each other and then read out. When, on the other hand, the solid-state image sensor is driven by the pulse group supplied from the second driving circuit, the signals of the photodiodes of the two rows adjacent to each other in the vertical direction are separately read out at different time instants, and then written in a memory. These signals which have been written into the memory are read out in a time sequence different from another time sequence during the writing operation, and are then displayed on a screen of a monitor. The deterioration of the vertical resolution due to the electric zooming-in imaging operation is prevented.

20 Claims, 12 Drawing Sheets

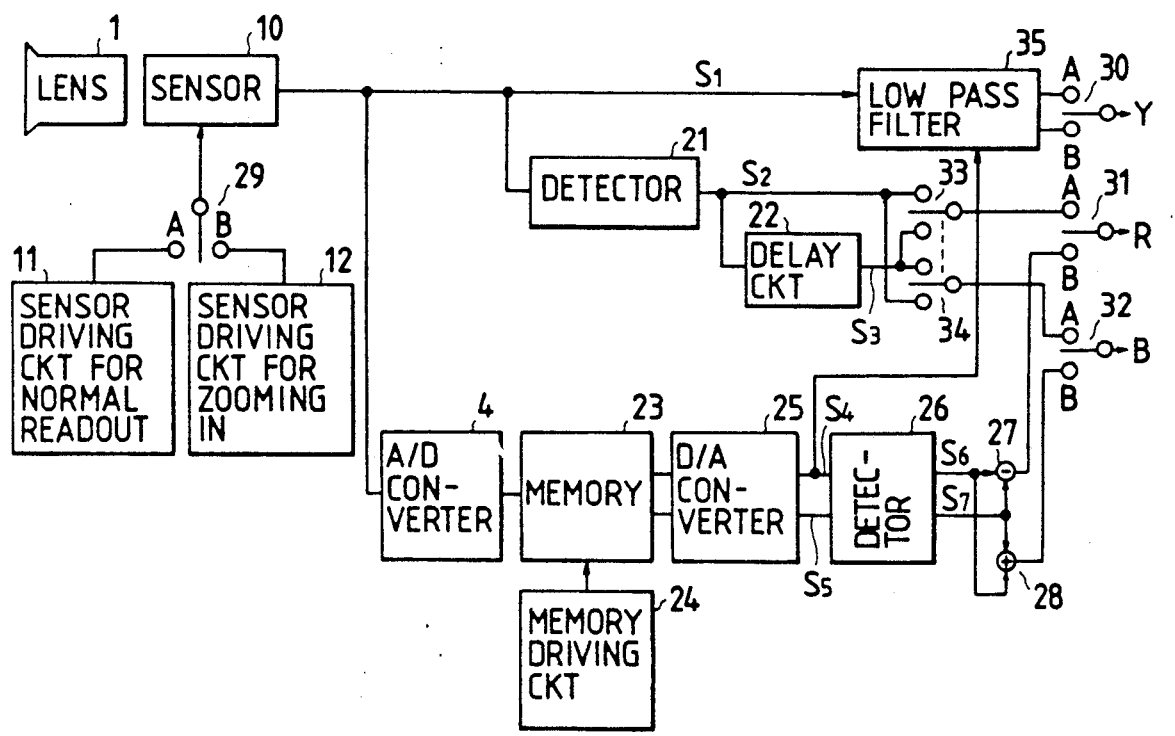

IMAGE PICK-UP APPARATUS WITH ELECTRONIC ZOOMING-IN

BACKGROUND OF THE INVENTION

The present invention generally relates to an image pick-up apparatus employing a solid-state image sensor. More particularly, the present invention is directed to a system for enlarging an image using electronic circuits, i.e., a system for zooming-in by means of electronic circuits.

While the semiconductor process technique typically utilized in a semiconductor memory has been improved more and more, the performance and yield of a solid-state image sensor (simply referred to as a "sensor" hereinafter) could be improved. As a result, an image pick-up tube employed in a video camera as the typical image pick-up apparatus has been substituted by this sensor. The major advantage of employing such a sensor in a video camera is to achieve a compact video camera. Under such a circumstance, various types of sensors have been recently developed in, for instance, "Quasi-field Integration CCD Color Camera" by M. Shimura et al, ITEJ Technical Report, Vol. 10, No. 52, pages 37 to 42, Feb. 1987. However, the zooming function of the conventional video camera, which is one of the necessary functions to the compact video camera, is realized by employing only the optical lens. Accordingly, there is a certain limitation on the magnification of the zooming lens in view of the conventional compact video camera.

On the other hand, since the memory capacity of the semiconductor memory is becoming larger and larger and also the cost thereof is becoming lower and lower, there is a tendency that the signal process in the video camera be performed by utilizing the memories.

Thus, if a picture is enlarged by utilizing the memories in the signal process, the entire optical lens system can be made compact. An image pick-up apparatus including such a picture enlarging system as represented in FIG. 1 may be conceive by the inventors of the present application In FIG. 1, reference numeral 1 indicates an optical lens; reference numeral 2 denotes a sensor; reference numeral 3 represents a sensor driving circuit; reference numeral 4 is an analog-to-digital converter (hereinafter abbreviated as an "A/D converter"); reference numeral 5 denotes a memory; reference numeral 6 represents a digital-to-analog converter (hereinafter abbreviated as a "D/A converter"); reference numeral 7 indicates a memory driving circuit; and, reference numeral 8 represents a switch.

In response to a driving pulse derived from the sensor driving circuit 3, a video signal "$S_N$" as represented in FIG. 2, is obtained from the sensor 2. In FIG. 2, numerals "1" to "M" represent an i-th horizontal scanning period ("i" being 1, 2, - - -, M) during the vertical scanning period The video signal $S_N$ is analog-to-digital-converted by the A/D converter 4, and then stored into the memory 5. The signal stored in the memory 5 is slowly read out from the memory 5 by the memory driving circuit 7. Then, the readout signal is digital-to-analog-converted by the D/A converter 6 so as to obtain a zooming-in video signal "$S_z$".

A picture zooming-in operation will now be described in detail First, a zooming-in operation in the vertical direction will now be described. A ½ video signal in the vertical direction is stored in the memory 5 from an (M/4+1) horizontal scanning period to a (¾M) horizontal scanning period. When the video signal is read out from the memory 5, the above-described video signal in the (M/4+1) horizontal scanning period is read out from the first horizontal scanning period to the second horizontal scanning period. Subsequently, the j-th ("j" being M/4+1, - - -, ¾M) video signal is successively read out. As a result, the picture is enlarged twice in the vertical direction.

As to the zooming-in operation in the horizontal direction, the video signal is stored in the memory during a ½ time period of a center of the horizontal scanning period When the video signal is read out from the memory, the video signal is read out at a half frequency of the frequency at which the video signal is stored. Then, the picture is enlarged twice in the horizontal direction.

However, the following two items, are not considered in the above-described technique. That is:

(i) the deterioration in the vertical resolution, and
(ii) the line misplacement.

A description will now be first made to the item (ii). When the video signal readout by the sensor 2 shown in FIG. 1 is carried out, it is necessary that in order to cancel an image lag, and also to correspond to an interlace scanning of a television monitor, the signals of photoelectric conversion elements arranged in two rows adjacent to each other in the vertical direction, the photoelectric conversion elements being arranged in a two dimensional form on a light receiving surface of the sensor, are simultaneously read under such a condition that either a combination of these adjacent two rows, or a pair of these rows are changed between the odd number field and even number field, as illustrated in FIG. 3. At this time, a luminance signal $S_{k, k+1}$ is produced by adding the signal of k-th row to the Signal of (k+1)th row. As a result, when the image is enlarged, the luminance signals $S_{k, k+1}$; $S_{k, k+1}$; $S_{k+2, k+3}$; $S_{k+2, k+3}$; - - - are sequentially read out from the memory 5 in the odd number field, whereas the luminance signals $S_{k+1, k+2}$; $S_{k+1, k+2}$; $S_{k+3, k+4}$; $S_{k+3, k+4}$; - - - are successively read out from the memory 5 in the even number field. In FIG. 4, there is shown a case in which these luminance signals are reproduced by a television monitor. In FIG. 4, a dot line represents a scanning line in the even number field, whereas a solid line denotes a scanning line in the odd number field. There are shown the luminance signals $S_{k, k+1}$; $S_{k+1, k+2}$; - - - which are Successively displayed from the top portion of FIG. 4. At this time, as represented in FIG. 4, the luminance signals $S_{k+1, k+2}$; $S_{k, k+1}$; - - - are sequentially, mistakenly displayed in this order on the screen of the television monitor, instead of representing the luminance signals $S_{k, k+1}$; $S_{k+1, k+2}$; - - - on the screen in this order. This corresponds to the line misplacement, and the similar line misplacement occurs in the chrominance signal. As a consequence, the image quality of the horizontal edge portion (i.e., a rapid change in an image between a certain scanning line and a subsequent scanning line) of an object to be imaged is deteriorated.

Then, the deterioration of the vertical resolution as described in the item (i) will now be described. When the picture is enlarged, since the same luminance signals are displayed during two horizontal scanning periods, the vertical resolution is considerably deteriorated.

SUMMARY OF THE INVENTION

An object of the present invention is to provide an image pick-up apparatus capable of performing an image enlargement, namely an electronic zooming-in operation with a lower deterioration of the vertical resolution.

Another object of the present invention is to provide an image pick-up apparatus capable of performing an image enlargement, namely an electronic zooming-in operation without the line misplacement of the signal.

The above objects are accomplished according to the present invention by providing an image pick-up apparatus which comprises a solid-state image sensor including a plurality of photoelectric conversion elements arranged in a two-dimensional form and a signal readout circuit for deriving from these photoelectric conversion elements signal charges accumulated in the photoelectric conversion elements and for deriving from the solid-state image sensor the signal charges as an output signal of the solid-state imaging sensor, a first driving circuit for supplying a first driving pulse group to the signal readout circuit so as to simultaneously read out within the same one horizontal scanning period the signal charges accumulated in the photoelectric conversion elements arranged in two rows adjacent to each other in a vertical direction, a second driving circuit for supplying a second driving pulse group to the signal readout circuit so as to separately read out the signal charges accumulated in the photoelectric conversion elements arranged in the two rows adjacent to each other in the vertical direction, a memory for storing a signal read out with the signal readout circuit driven by the second driving pulse group, and a memory driving circuit for reading out from the memory the signal stored in the memory in a time sequence different from another time sequence at which the signal has been stored in the memory.

Another object achieved according to the present invention is achieved by providing an image pick-up apparatus which comprises a solid-state image sensor including a plurality of photoelectric conversion elements arranged in a two-dimensional form and a signal readout circuit for deriving from these photoelectric conversion elements signal charges accumulated in the photoelectric conversion elements and for deriving from the solid-state image sensor the signal charges as an output signal of the solid-state imaging sensor, a first driving circuit for supplying a first driving pulse group to the signal readout circuit so as to read out the signal charges accumulated in the photoelectric conversion elements at different time sequences with each other in an odd number field and an even number field, second driving circuit for supplying a second driving pulse group to the signal readout circuit so as to read out the signal charges accumulated in the photoelectric conversion elements at an identical time sequence in both the odd number field and even number field, a memory for storing a signal read out with the signal readout circuit driven by the second driving pulse group, and a memory driving circuit for reading out the signal stored in the memory from the memory.

When the signals of the respective odd number rows and even number rows are treated as independent luminance signals, a quantity of information in the vertical direction becomes twice that of a conventional image pick-up apparatus so that the deterioration of the vertical resolution during the electronic zooming-in operation can be suppressed.

When, for instance, the signals are read out every field in the combination with the odd number field in FIG. 3, the display sequence of the video signals shown in FIG. 4 is the luminance signals $S_{k, k+1}$; $S_{k, k+1}$; $S_{k, k+1}$; $S_{k, k+1}$; $S_{k+2, k+3}$; $S_{k+2, k+3}$; $S_{k+2, k+3}$; $S_{k+2, k+3}$, ---, from the top portion of FIG. 4, so that no line misplacement of the luminance signal occurs.

BRIEF DESCRIPTION OF THE DRAWINGS

In the accompanying drawings:

FIGS. 7A, 7B and 7C are timing charts of the pulse groups for driving the image sensor shown in FIG. 6, and FIGS. 7A and 7B represent the timing charts of the pulse groups in one field and a subsequent field during the normal readout operation, while FIG. 7C represents the timing chart of the pulse group during the electronic zooming-in operation;

FIG. 13A represents the timing chart during the normal readout operation, and FIG. 13B represents the timing chart during the electronic zooming-in operation;

FIG. 14 is a block diagram for indicating an image pick-up apparatus according to another embodiment of the present invention;

FIG. 15 is an illustration for representing one example of a color filter employed in the image sensor of the image pick-up apparatus shown in FIG. 14;

FIG. 16A represents the signal during the normal readout operation, and FIG. 16B indicates the signal during the electronic zooming-in operation;

DETAILED DESCRIPTION OF EMBODIMENTS

Figure 1:
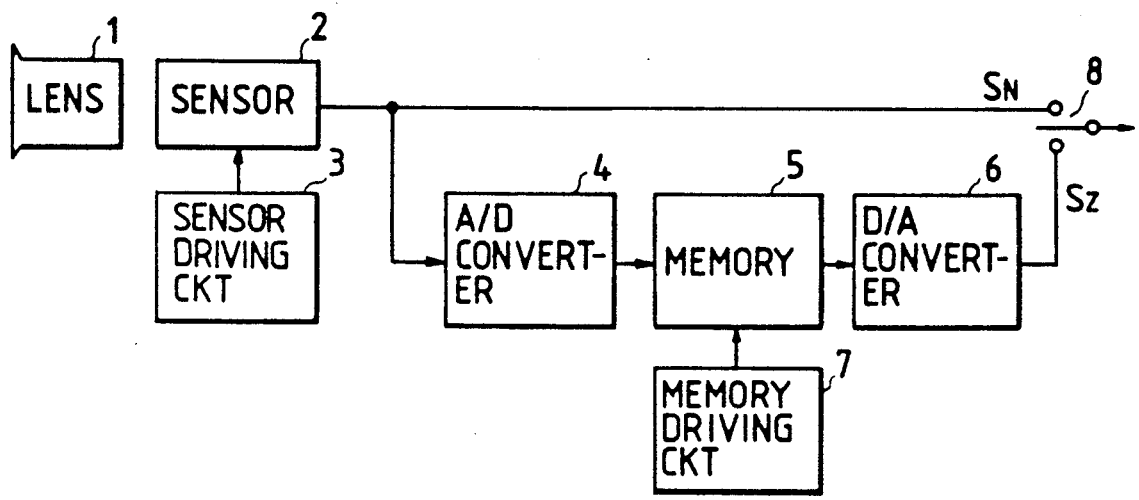
FIG. 1 is a block diagram of an image pick-up apparatus capable of performing an electronic zooming-in operation.
Figure 2:
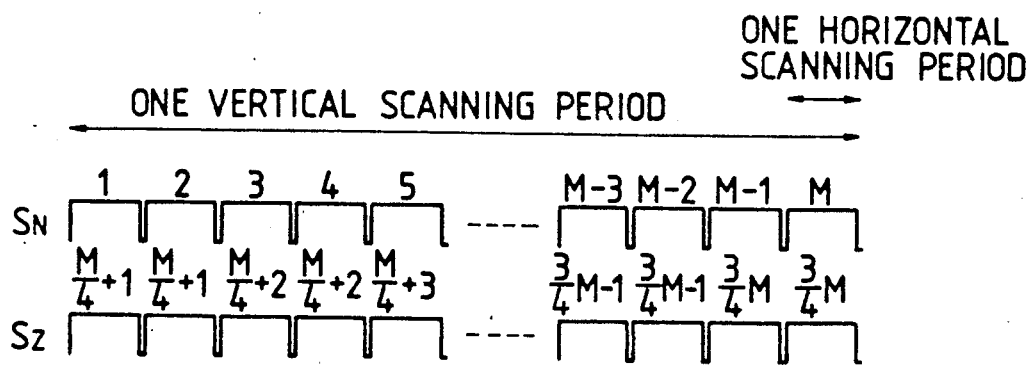
FIG. 2 is a signal waveform chart for explaining an operation of the image pick-up apparatus shown in FIG. 1.
Figure 3:
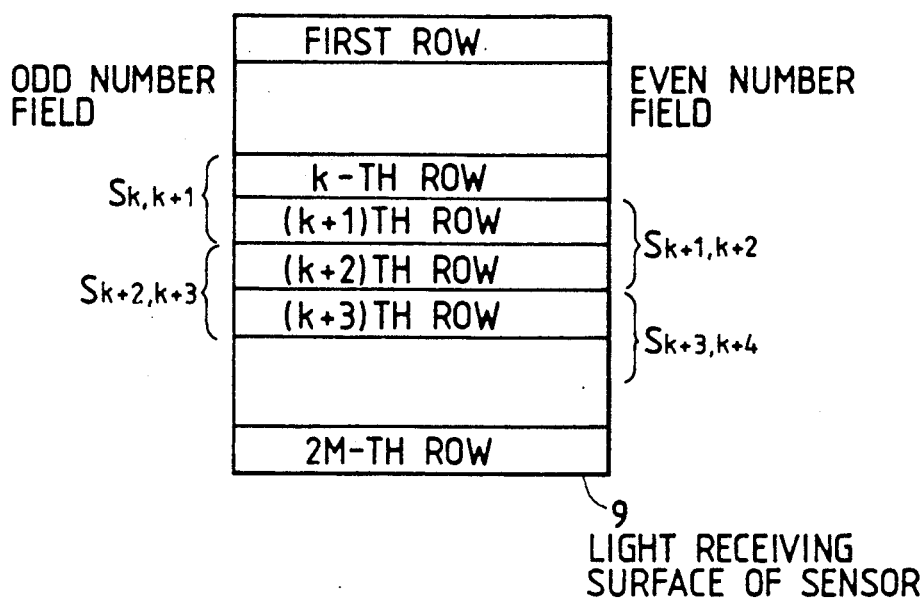
FIG. 3 is an illustration for explaining a readout method of a video signal from a sensor employed in the image pick-up apparatus shown in FIG. 1.
Figure 4:
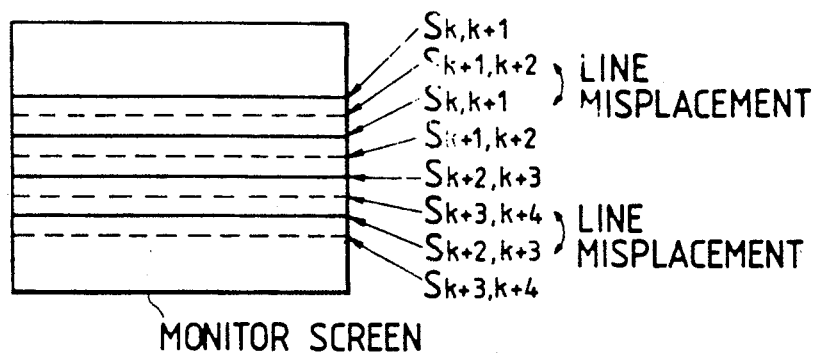
FIG. 4 is an illustration for representing a screen on which the picture signal read out by the method of FIG. 3 is reproduced by a television monitor.
Figure 5:
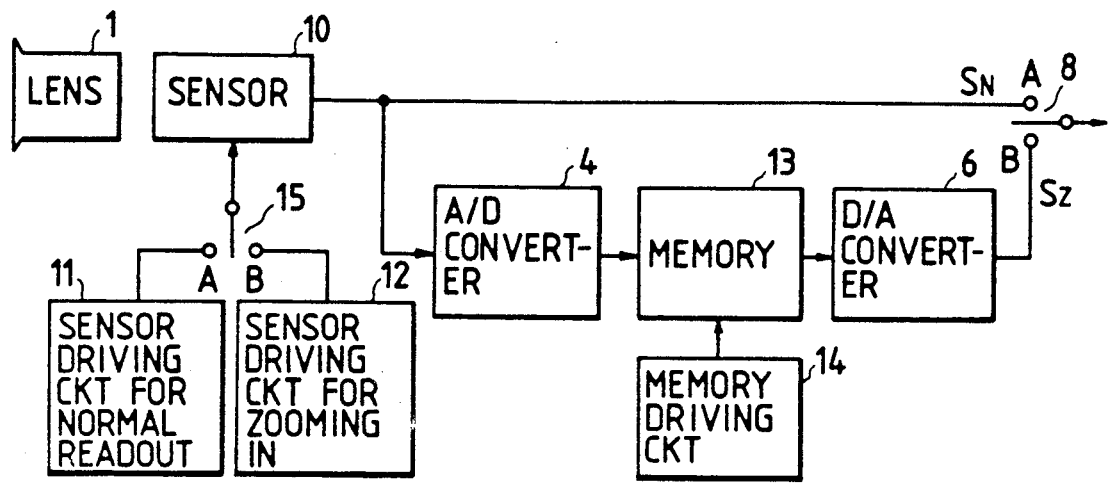
FIG. 5 is a block diagram of an image pick-up apparatus according to an embodiment of the present invention.

Referring now to FIG. 5, an embodiment of the present invention will be described. FIG. 5 is a block diagram of an image pick-up apparatus by which the deterioration of the vertical resolution can be prevented. In FIG. 5, reference numeral 10 denotes a sensor; reference numeral 11 indicates a sensor driving circuit for normal readout; reference numeral 12 represents a sensor driving circuit for zooming in; reference numeral 13 is a memory; reference numeral 14 represents a memory driving circuit; and reference numeral 15 denotes a switch. It should be noted that the same reference numerals shown in FIG. 1 will be employed as those for denoting the same or similar circuit elements in the following figures. While the switch 15 is connected to a side "A", another switch 8 is similarly connected to a side "A" so that the sensor output signal "SN" which has been read out by the normal readout pulse group supplied from the driving circuit 11 is output. Conversely, while the switch 15 is connected to a side "B", the switch 8 is similarly connected to a side "B", so that after the sensor output which has been read out in response to the signal readout driving pulse group for electronic zooming-in operation supplied from the driving circuit 12 has been analog-to-digital-converted by the A/D converting circuit 4, the converted digital signal is stored in the memory 13, the stored signal is read out at a time sequence different from the time sequence at which the digital signal has been stored, and then the readout signal is digital-to-analog-converted by the D/A converting circuit 6, whereby an analog signal is output from the image pick-up apparatus shown in FIG. 5.

Figure 6:
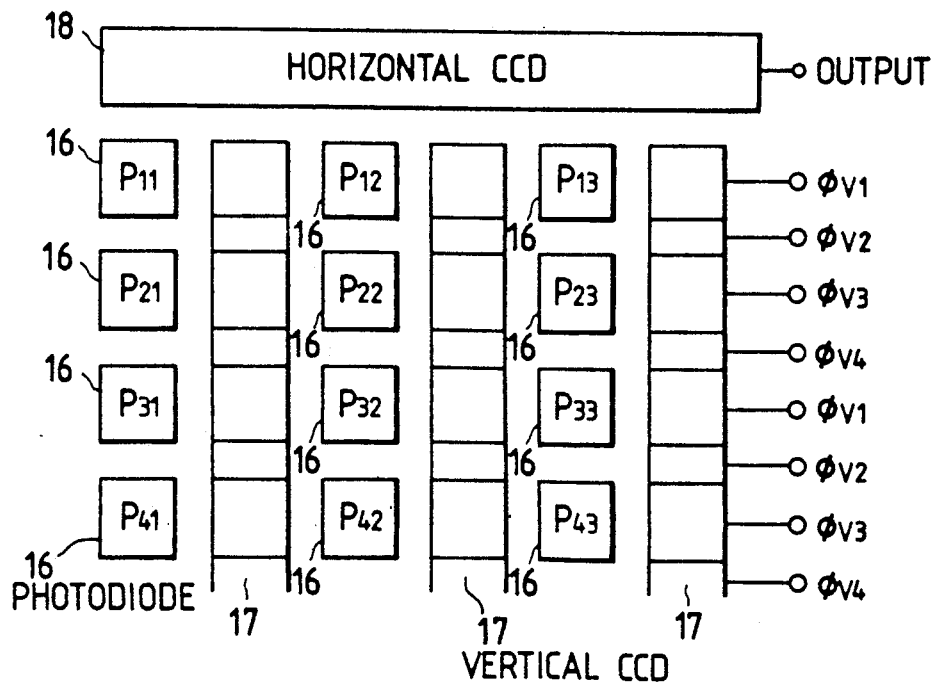
FIG. 6 is a plan view of one example of an image sensor employed in the image pick-up apparatus shown in FIG. 5.
Figure 7A:
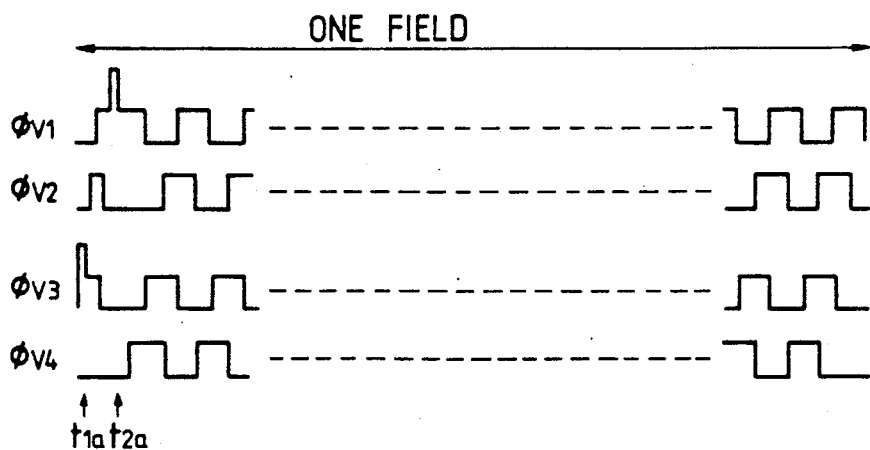
Figure 7B:
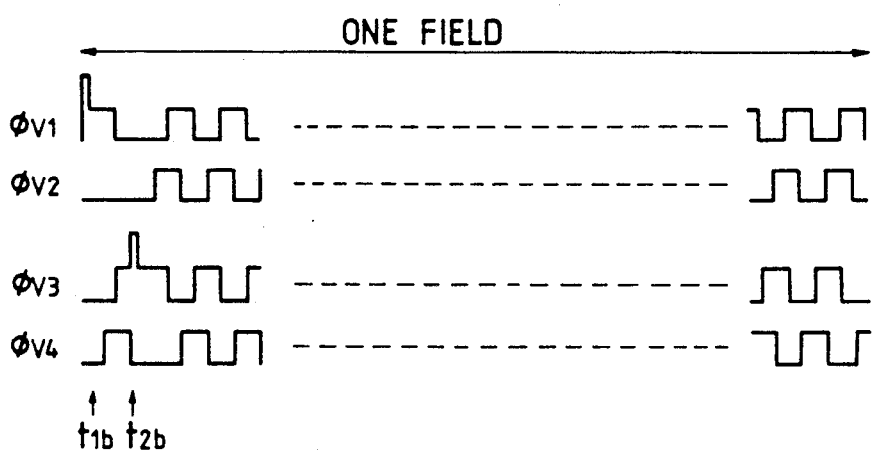
Figure 7C:
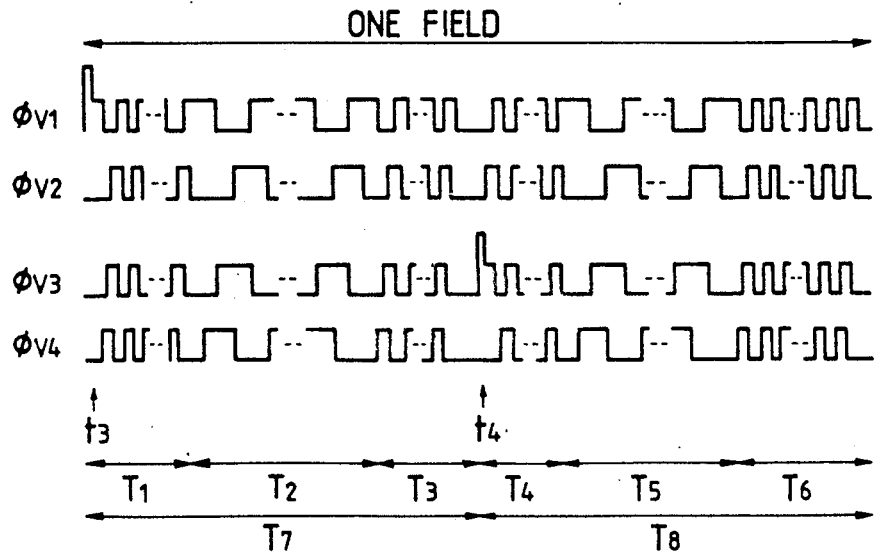

In FIG. 6, there is shown one example of the sensor 10. In FIG. 6, reference numeral 16 denotes a photodiode; reference numeral 17 indicates a vertical CCD (charge-coupled device); and reference numeral 18 represents a horizontal CCD. Symbol "Pm, n" represents m-th row and n-th column photodiodes, in which the photodiodes are arranged up to the m-th row as well as the n-th column. In other words, "m" are 1,2,3, - - - , M whereas "n" are 1,2,3, - - - , N. FIGS. 7A, 7B and 7C represent timing charts of driving pulse groups $\phi_{V1}$ to $\phi_{V4}$ during the normal readout operation and also the electronic zooming-in operation. Referring first to FIGS. 7A and 7B, a description will be made to the normal readout operation. FIG. 7A represents a certain one field. In FIG. 7A, the pulse series $\phi_{V3}$ become the maximum level at a time instant "$t_{1a}$" and the signal charges which have been accumulated in the photodiodes arranged in the even number rows are transferred to a $\phi_{V3}$ stage (an area beneath a gate electrode of the vertical CCD 17 to which the pulse series $\phi_{V3}$ is applied) of the vertical CCD 17. Up to a time instant "$t_{2a}$", *the above signal charges are transferred to a $\phi_{V1}$* stage, and then at the time instant "$t_{2a}$", *the pulse series "$\phi_{V1}$"* becomes the maximum level and the signal charges which have been accumulated in photodiodes arranged in the odd number rows are transferred to a $\phi_{V1}$ stage of the vertical CCD 17. As a result, the signal charges which have been accumulated in the photodiodes arranged in the adjacent even number rows and odd number rows are mixed at the $\phi_{V1}$ stage in a time instant "$t_{2a}$". Thereafter, every one horizontal scanning period, the signal charges present in the $\phi_{V1}$ stage are transferred to the horizontal CCD 18 and the signal charges are transferred in the horizontal direction by the horizontal CCD 18 and thereafter output from the horizontal CCD 18.

FIG. 7B represents a field subsequent to the field shown in FIG. 7A. In the next field, the pulse series $\phi_{V1}$ becomes the maximum level at a time instant "$t_{1b}$" and the signal charges which have been accumulated in the photodiodes arranged in the odd number rows are transferred to the $\phi_{V1}$ stage of the vertical CCD 17. Up to a time instant "$t_{2b}$", the signal charges are transferred to the $\phi_{V3}$ stage. At a time instant "$t_{2b}$", the pulse series $\phi_{V3}$ becomes the maximum level, and the signal charges which have been accumulated in the photodiodes arranged in the even number rows are transferred to the $\phi_{V3}$ stage of the vertical CCD 17. As a consequence, the signal charges of the adjacent odd number rows and even number rows are mixed at the $\phi_{V3}$ stage in the combinations of the odd number rows with the even number rows, which are shifted by one row, as compared with the combinations in the previous field shown in FIG. 7A. Thereafter, every one horizontal scanning period, the signal charges existing in the $\phi_{V1}$ stage of the vertical CCD 17 are transferred to the horizontal CCD 18, and the signal charges are transferred by the horizontal CCD 18 in the horizontal direction, and subsequently output from the horizontal CCD 18.

As previously explained, either "the combination" or "the pair" of the adjacent two rows whose signal charges should be mixed are different between odd number field and even number field. As a result, the interlace scanning is executed.

Referring now to FIG. 7C, the electronic zooming-in operation will be described. In FIG. 7C, there is shown a certain one field during which the electronic zooming-in operation is carried out. At a time instant "$t_3$", the pulse series $\phi_{V1}$ becomes the maximum level, and the signal charges which have been accumulated in the photodiodes arranged in the odd number fields are transferred to the $\phi_{V1}$ stage of the vertical CCD 17. Until the signal charge accumulated in the photodiode, positioned at the $(M/4+1)$-th row is transferred to the horizontal CCD 18 during a time period "$T_1$", the signal charges within the vertical CCD 17 are transferred at a high speed in the upper direction shown in FIG. 6. Thereafter, the signal is read out in one row unit every one horizontal scanning period, and the signals are read out within a time period "$T_2$" until the $(\frac{3}{4}M-1)$-th row, and the signal readout is completed. During a time period "$T_3$", the signal charges accumulated in the photodiodes positioned in the remaining odd number rows are transferred at a high speed in the upper direction shown in FIG. 6. In other words, all of the signals of the odd number rows have been completely read out at a time period "$T_7$". During the time period "$T_2$" within the time period "$T_7$", the signals are read out which have been accumulated in the photodiodes positioned in the odd number rows and M/4 rows of the central portion along the vertical direction among the photodiodes arranged in a two-dimensional form. Then, at a time instant "$t_4$", the pulse series "$\phi_{V3}$" becomes the maximum level, and the signal charges accumulated in the photodiodes positioned at the even number rows are transferred to the $\phi_{V3}$ stage. Similarly, until the signal charge accumulated in the photodiode positioned at the (M/4+2)-th row is transferred to the horizontal CCD 18 during the time period "T$_4$", the signal charge within the vertical CCD 17 are transferred at a high speed in the upper direction of FIG. 6. Thereafter, the signal is read out in one row unit every one horizontal scanning period, and then the signal readout operation is accomplished until the (¾M)-th row during the time period "T$_5$". During the time period "T$_6$", the signal charges accumulated in the photodiodes positioned at the remaining even number rows are transferred at the high speed in the upper direction of FIG. 6. That is to say, all of the signals at the even number rows have been completely read out during a time period "T$_8$". During the time period "T$_5$" within the time period "T$_8$", the signals accumulated in the photodiodes positioned in the even number rows and M/4 rows of the central portion along the vertical direction among the photodiodes arranged in the two-dimensional form, are read out.

The signals at the odd number rows read out during the time period "T$_2$", and the signals at the even number rows read out during the time period "T$_5$" are stored in the memory 13. These signals are alternately read out by one row unit from the memory 13 in the order of the odd number row and the even number row.

Figure 8:
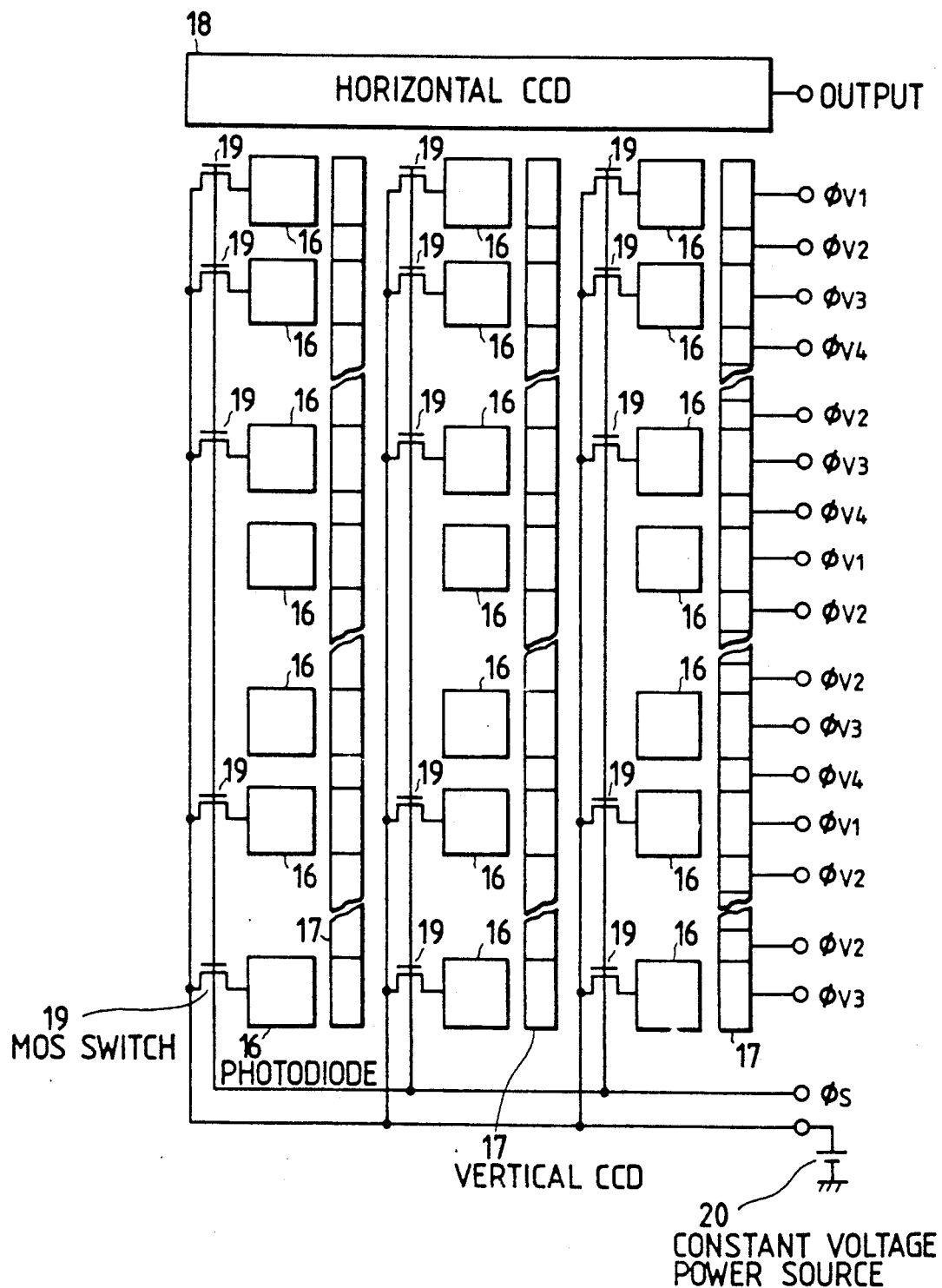
FIG. 8 is a plan view of another image sensor employed in the image pick-up apparatus shown in FIG. 5.
Figure 9:
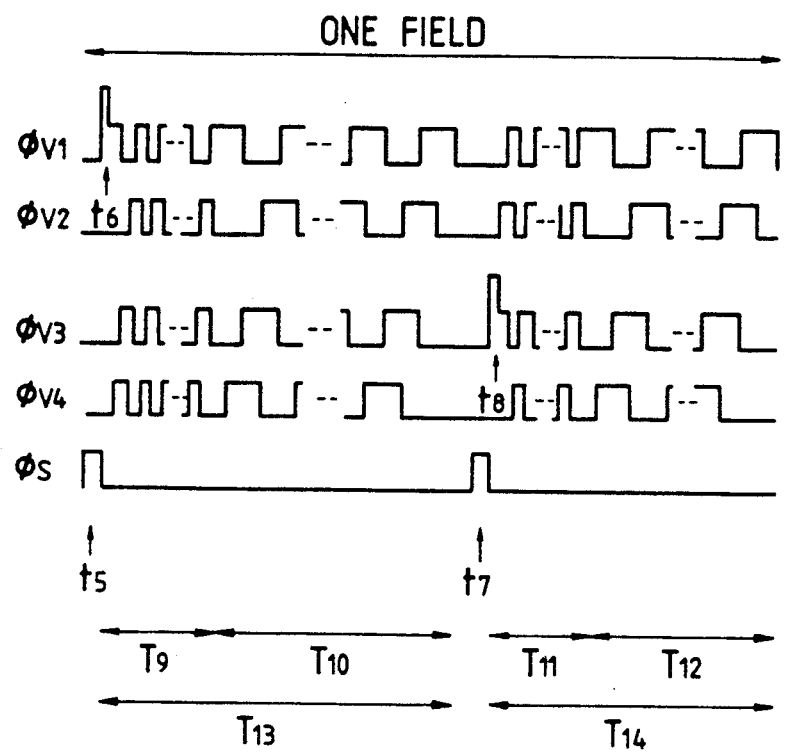
FIG. 9 represents a timing chart of the pulse group for driving the image sensor shown in FIG. 8, i.e., the timing chart thereof during the electronic zooming-in operation.

In FIG. 8, there is shown another example of the sensor 10. In this figure, reference numeral 19 denotes an MOS (metal oxide semiconductor field-effect transistor) switch; reference numeral 20 indicates a constant voltage power source. The example shown in FIG. 8 is similar to the previous example shown in FIG. 6 except that it also includes MOS switches 19, a constant voltage power source 20 and a pulse series $\phi_S$. That is to say, in the example represented in FIG. 8, the MOS switches 19 are connected to the photodiodes positioned from the first row to the (M/4)-th row, and from the (¾M+1)-th row to the M-th row along the vertical direction. The signal charges accumulated in these diodes are swept away via the MOS switches 19 to the external circuit. No MOS switch 19 is connected to the photodiodes positioned from the (M/4+1)-th row to the (¾M)-th row. Since the normal readout operation of the sensor shown in FIG. 8 is the same as that shown in FIG. 6, the remaining electronic zooming-in operation thereof will now be described with reference to a timing chart for explaining the driving pulse groups $\phi_{V1}$ to $\phi_{V4}$, and $\phi_S$ for the electronic zooming-in operation shown in FIG. 9. At a time instant "t$_5$" the pulse series $\phi_S$ becomes the high level, so that the MOS switches 19 are brought into the conducting states, and the signal charges accumulated in the photodiodes positioned from the first row to the (M/4)-th row, and from the (¾M+1)-th row to the M-th row are swept out. At the next time instant "t$_6$", the signal charges accumulated in the photodiodes positioned in the odd number rows are transferred to the $\phi_{V1}$ stage of the vertical CCD 17. At this time, since no signal charges accumulated in the photodiodes positioned at the other rows remain due to the above-described charge sweep-away operation, only the signal charges which have been accumulated in the photodiodes positioned from the (M/4+1)-th row to the (¾M-1) row are transferred to the $\phi_{V1}$ stage. The operation during the time period "T$_9$" and time period "T$_{10}$" is the same as that during the time period "T$_1$" and time period "T$_2$" shown in FIG. 7C. Since all of the signal charges accumulated in the photodiodes positioned up to the (¾M-1)-th row are completely read out at the end of the time period "T$_{10}$", no signal is present in the vertical CCD 17. Accordingly, at the time period "t$_7$" succeeding to the above time period "T$_{10}$", the signal charges are again swept away by the MOS switches 19, and thereafter at a time instant "t$_8$", the signal charges accumulated in the photodiodes positioned at the even number rows can be transferred to the $\phi_{V3}$ stage of the vertical CCD 17. It should be noted that the operation effected during the time periods "T$_{11}$" and "T$_{12}$" is the same as that executed during the time periods "T$_4$" and "T$_5$" as shown in FIG. 7C. In the present example, both the signals at the odd number rows read out during the time period "T$_{10}$", and also the signals at the even number rows read out during the time period "T$_{12}$" are stored in the memory 13, while these signals are alternately read out by one row unit from the memory 13 in the order of the odd number row and the even number row. In accordance with the present example, the high speed signal transfer during the time periods "T$_3$" and "T$_6$" shown in FIG. 7C is unnecessary.

Figure 11:
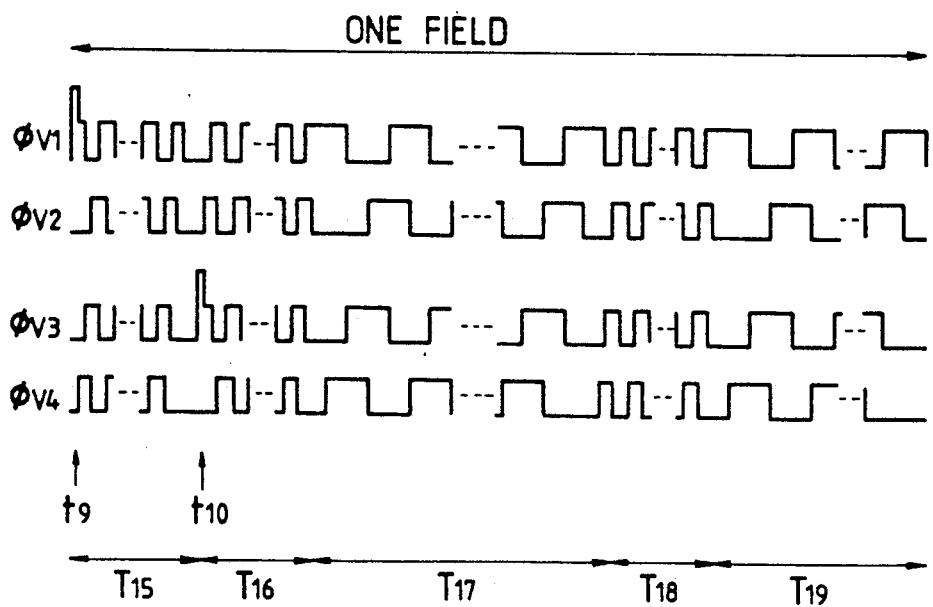
FIG. 11 is a timing chart of the pulse group for driving the image sensor shown in FIG. 10, namely represents the timing chart thereof during the electronic zooming-in operation.
Figure 10:
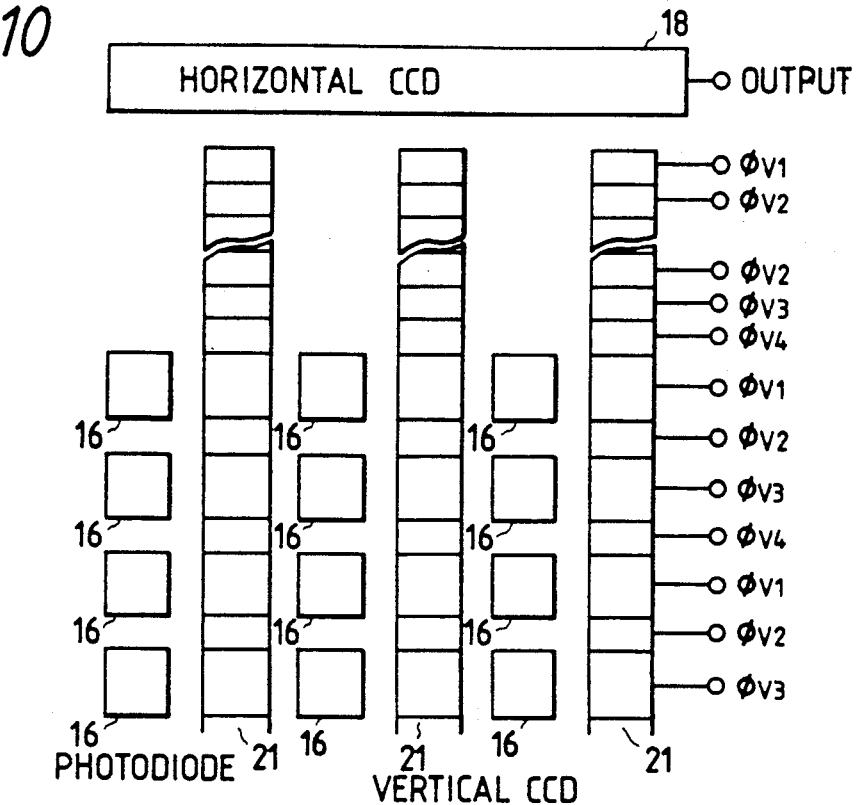
FIG. 10 is a plan view of another image sensor employed in the image pick-up apparatus illustrated in FIG. 5.

In FIG. 10, there is shown a further example of the sensor 10. In FIG. 10, reference numeral 21 is a vertical CCD which includes stages (generally so-called as "memory stages or memory parts") not adjacent to the photodiode 16, as compared with the image sensor shown in FIG. 6. In general, such a sensor is called as a "frame interline transfer type CCD image sensor". As the normal readout operation, the high speed signal transfer during the time period "T$_1$" of FIG. 7C is merely added after the time instants "t$_{2a}$" and "t$_{2b}$" of FIGS. 7A and 7B. The electronic zooming-in operation will now be described with reference to a timing chart shown in FIG. 11. The signal charges accumulated in the photodiodes positioned in the odd number rows are transferred at a time instant "t$_9$" to the stage $\phi_{V1}$ of the vertical CCD 21, and are transferred to the memory stages within the time period "T$_{15}$". As a result, since at the end of the time period "T$_{15}$", no signal charge is present at the stage adjacent to the photodiode 16, the signal charges accumulated in the photodiodes positioned at the even number rows can be transferred to the $\phi_{V3}$ stage of the vertical CCD 21 at the time instant "t$_{10}$". Until the signal of the (M/4+1)-th row has been transferred to the horizontal CCD 18, the signal in the vertical CCD 21 is transferred at a high speed in the upper direction of FIG. 10 during the time period "T$_{16}$". Thereafter, the signals are read out every one horizontal scanning period in one row unit, and all of the signals up to the (¾M-1) row have been completely read out within the time period "T$_{17}$". During the time period "T$_{18}$", the signals of the remaining odd number rows and also the signals up to the (M/4)-th row among the even number rows are transferred in the upper direction of FIG. 10 at a high speed, and finally the signal at the (M/4+2)-th row is transferred to the horizontal CCD 18. During the time period "T$_{19}$", the signal is read out every one horizontal scanning period in one row unit, and all of the signals up to the (¾M)-th row are completely read out. In this example, both the signals at the odd number rows read out during the time period "T$_{17}$", and the signals at the even number rows read out during the time period "T$_{19}$" are stored in the memory 13, and the signals are alternately read out from the memory 13 in the order of the odd number rows and even number rows by one row unit. According to the present example, since a time difference between the time instant "$t_9$" at which the signals accumulated in the photodiodes positioned in the odd number rows are transferred to the vertical CCD 21, and the time instant "$t_{10}$" at which the signals accumulated in the photodiodes positioned at the even number rows are transferred to the vertical CCD 21 can be set to be small, there is a particular advantage when the electronic zooming-in operation is carried out for the moving object to be imaged.

It should be noted that the MOS switches 19 for sweeping away the charges as shown in FIG. 8 may be provided in the image sensor shown in FIG. 10. In this case, the total number of the memory stages and also the total number of the high-speed pulses during the time periods "$T_{15}$" and "$T_{18}$" represented in FIG. 11 may be reduced.

Figure 12:
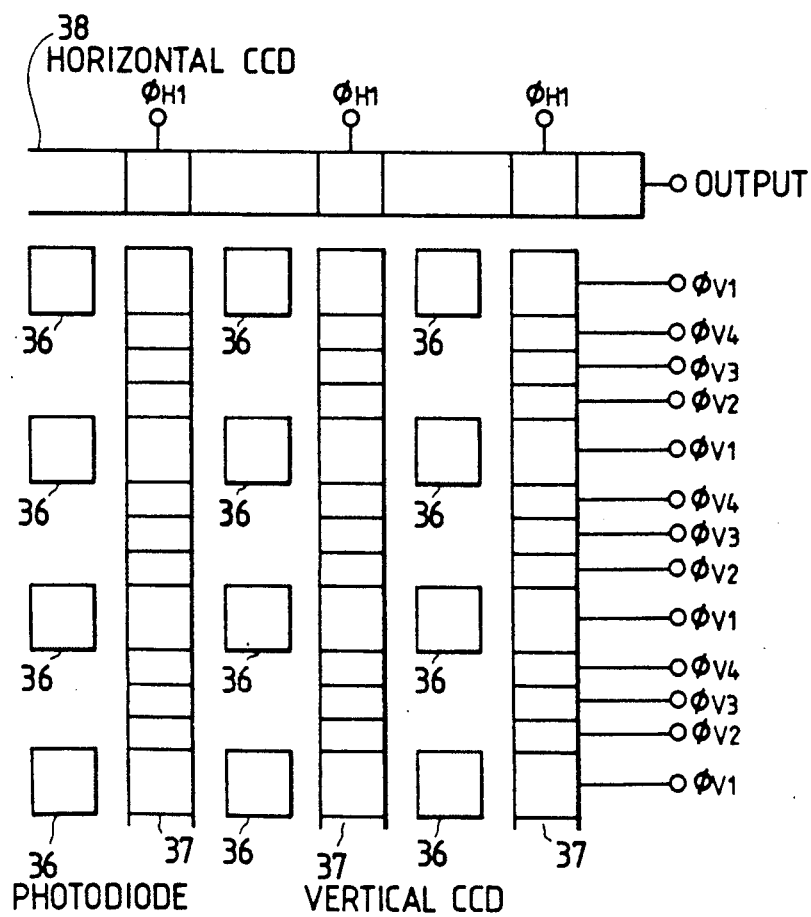
FIG. 12 is a plan view of a further example of an image sensor employed in the imaging pick-up apparatus shown in FIG. 5.
Figure 13A:
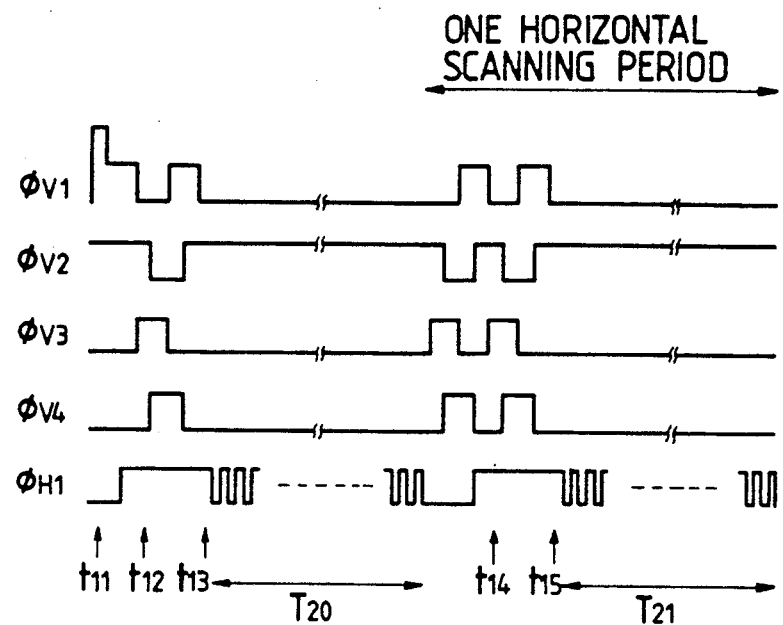
FIGS. 13A and 13B are timing charts of the pulse groups for driving the image sensor shown in FIG. 12, namely.

In FIG. 12, there is represented a still further example of the sensor 10. In FIG. 12, reference numeral 36 denotes a photodiode; reference numeral 37 indicates a vertical CCD; and reference number 38 represents a horizontal CCD. Operations of this sensor will now be described with reference to timing charts shown in FIGS. 13A and 13B. FIG. 13A is a timing chart of a pulse group during the normal readout operation. At a time instant "$t_{11}$", all of the signal charges accumulated in the photodiodes 36 positioned in all of the rows are transferred to the $\phi_{v1}$ stage of the vertical CCD 37. At a time instant "$t_{12}$", the signal charges accumulated in the photodiodes arranged in the odd number rows are transferred to the $\phi_{H1}$ stage of the horizontal CCD 38. At a time instant "$t_{13}$", the signal charges accumulated in the photodiodes positioned at the even number rows are transferred to the $\phi_{H1}$ stage of the horizontal CCD 38. That is to say, the signal charges accumulated in the photodiodes positioned in two rows adjacent to each other in the vertical direction are mixed with each other at the $\phi_{H1}$ stage at the time instant "$t_{13}$". Thus, the mixed signals are successively output during the time period "$T_{20}$" to the external circuit. At the subsequent time instants "$t_{14}$" and "$t_{15}$", the signal charges accumulated in the photodiodes positioned at the succeeding odd number row and succeeding even number row are transferred to the $\phi_{H1}$ stage, and the transferred Signal charges are successively output to the external circuit. Subsequently, the signals accumulated in all of the photodiodes are repeatedly read out.

Figure 13B:
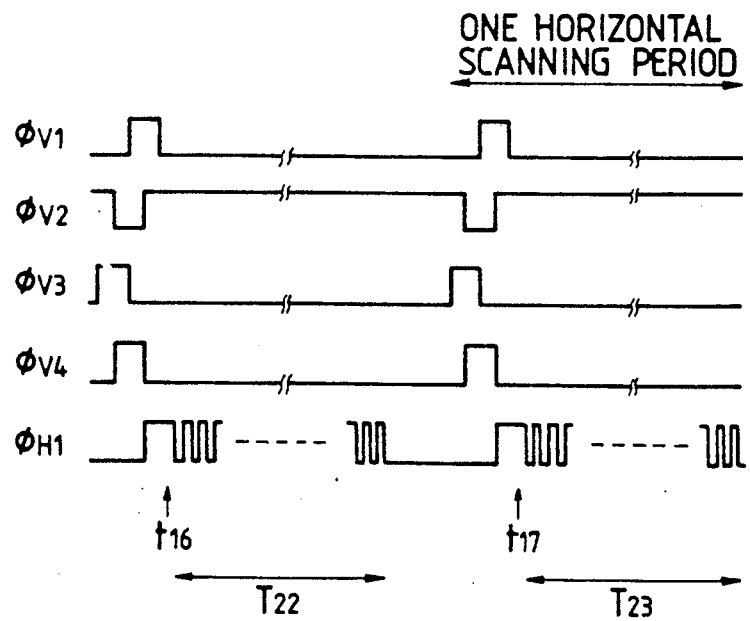

FIG. 13B represents a sensor driving pulse group for the electronic zooming-in operation. It should be noted that high-speed pulses for reading out the signal charges at the high speed accumulated in the photodiodes from the first row to the (M/4)-th row, and from the ($\frac{3}{4}$M+1)-th row to the M-th row are omitted from FIG. 13B. Only the signal charges accumulated in the photodiodes positioned in the odd number rows are transferred to the $\phi_{H1}$ stage at a time instant "$t_{16}$" and successively read out to the external circuit during a time period "$T_{22}$". Then, the signal charges accumulated in the photodiodes positioned at the even number row at a time instant "$t_{17}$" are transferred to the $\phi_{H1}$ stage, and are sequentially read out to the external circuit during a time period "$T_{23}$". According to the present example, since the signals accumulated in all of the photodiodes are simultaneously transferred to the vertical CCD, the resolution with respect to the moving object to be imaged is not deteriorated. Also, the MOS switches 19 for sweeping away the signal charges accumulated in the photodiodes positioned from the first row to the M/4-th row and from the ($\frac{3}{4}$M+1)th row to the M-th row may be provided similar to the sensor shown in FIG. 8.

Figure 16A:
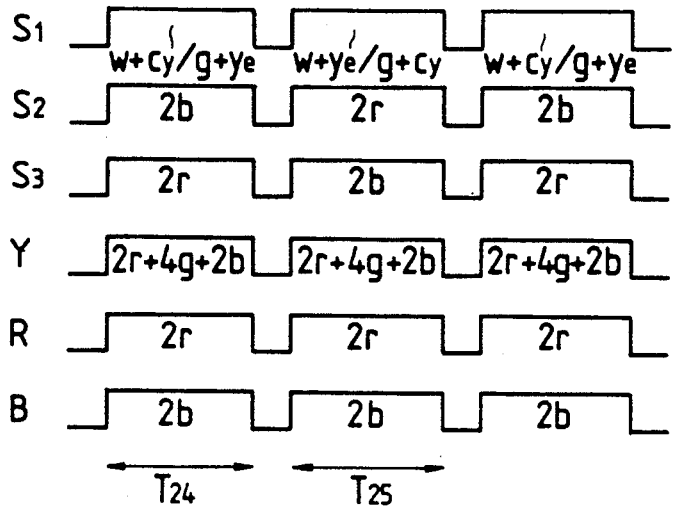
FIGS. 16A and 16B are signal waveform charts for explaining the operations of the image pick-up apparatus shown in FIG. 14, namely.
Figure 16B:
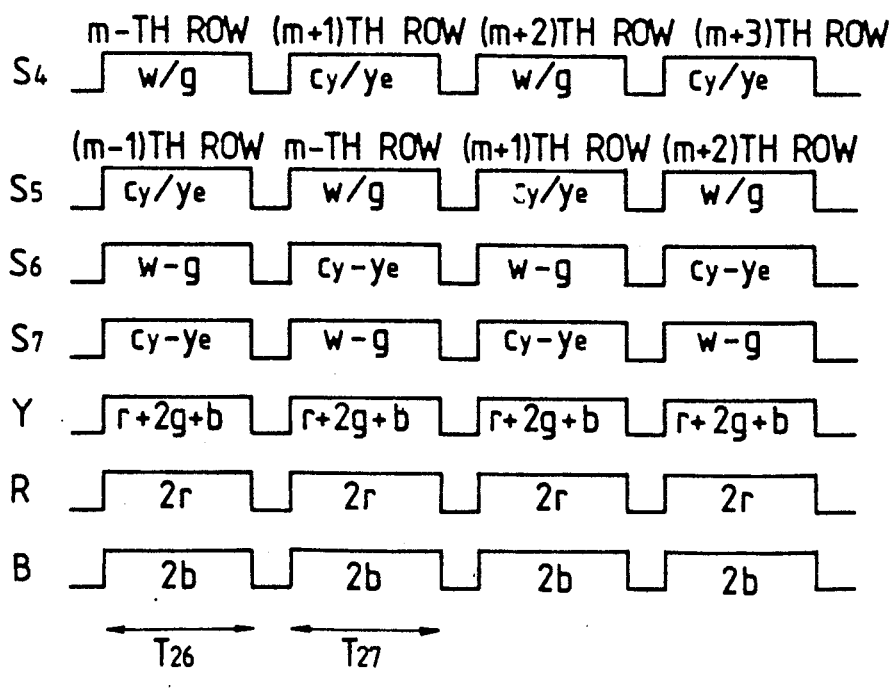

In the above-described examples, attention has been directed to the luminance signal. Then, there is shown in FIG. 14 an embodiment where an attention is directed to also the chrominance signal. In FIG. 14, reference numeral 21 indicates a detector; reference numeral 22 denotes a delay circuit; reference numeral 23 represents a memory; reference numeral 24 is a memory driving circuit; reference numeral 25 denotes a digital-to-analog (D/A) converter; reference numeral 26 is a detector; reference numeral 27 indicates a subtracter; reference numeral 28 represents an adder; reference numerals 29 to 34 represent switches; and reference numeral 35 is a low-pass filter. It should be noted that the same reference numerals shown in FIG. 5 will be employed as those for denoting the same or similar circuit elements in the following figures. A description will now be made to such a case that a color filter to be mounted on the sensor is a mosaic filter as represented in FIG. 15. In the mosaic filter shown in FIG. 15, a reference symbol "W" denotes an all color transmission (namely, transparent) filter; a reference symbol "G" indicates a green transmission filter; a reference symbol "$C_y$" represents a cyan transmission filter; and a reference symbol "$Y_e$" is a yellow transmission filter. In FIGS. 16A and 16B, there are shown signals "$S_1$" to "$S_7$", a luminance signal "Y", and a red signal "R" and a blue signal "B" of various circuits in an image pick-up apparatus when such a color filter is employed. Referring now to FIGS. 16A and 16B, this image pick-up apparatus will be described.

First, when the normal readout operation is carried out, the switches 29 to 32 are connected to the side "A". In this case, since the sensor 10 reads out the signals of the rows adjacent to each other in the vertical direction, as the signal "$S_1$", (w+cy) and (g+ye) are alternately read out during a time period "$T_{24}$", and (w+ye) and (g+cy) are alternately read out during a time period "$T_{25}$". It should be noted that reference symbols "w, cy, g, ye" indicate signals obtained from the W filter, Cy filter, G filter, and Ye filter photodiodes, respectively, and these signals are expressed as follows:

$$\begin{cases} w = r + g + b \\ cy = g + b \\ g = g \\ ye = r + g \end{cases}$$

where reference symbols "r, g, and b" designate red, green, and blue primary color signals, respectively. As a result, if the pass band of the signal $S_1$ is limited by the low-pass filter 35, the following luminance signal is obtained:

$$Y = w + cy + g + ye = 2r + 4g + 2b$$

On the other hand, when the signal "$S_1$" is detected by the detector 21, the following signal is obtained during a time period "$T_{24}$":

$$S_2 = (w + cy) - (g + ye) = 2b$$

Similarly, the following signal is obtained during a time period "$T_{25}$":

$$S_2 = (w + ye) - (g + cy) = 2r$$

As a consequence, the color signals of R=2r and B=2b are produced by selecting the signal "S₂" and a signal "S₃" with the switch, the signal "S₃" being obtained by delaying the signal "S₂" by one horizontal scanning period in the delay circuit 22.

While the electronic zooming-in operation is performed, the switches 29 to 32 are connected to the side "B", the signals of the odd number row and even number row are separately read out from the sensor 10, and the readout signals are converted by the A/D converter 4 into the corresponding digital signals which will be then stored into the memory 23. From the memory 23, both the signal of the m-th row and the signal of the (m−1)-th row are read out in parallel during a time period "T₂₆", whereas the signals of the (m+1)-th row and the m-th the row are read out in parallel. Signals "S₄" and "S₅" which are obtained by converting these signals in the D/A converter 26 correspond to such signals that during the time period "T₂₆", the signals (w, g) and (cy, ye) are alternately repeated, and during the time period "T₂₇", the signals (cy, ye) and (w, g) are alternately repeated. Therefore, when the signal "S₄" is filtered by the low-pass filter 35, the following luminance signal is obtained.

$$Y = w + g = cy + ye = r + 2g + b \ldots \quad (1)$$

When, on the other hand, the signals "S₄" and "S₅" are detected by the detector 26, during a time period "T₂₆", a signal "S₆" (=w−g) is obtained and another signal "S₇" (=cy−ye) is obtained. Also, a signal "S₆" (=cy−ye) and a signal "S₇" (=w−g) are produced during a time period "T₂₇". By subtracting the signal "S₇" from the signal "S₆" in the, subtracter 27, and adding the signal "S₇" to the signal "S₆" in the adder 28, color signals of R=2r, and B=2b are obtained. The reason why the luminance signal is obtained with the same structure ratio of the primary color signals every horizontal scanning period as defined in the above-described equation (1), is to select such a color filter that the spectral sensitivity of the odd number row is equal to that of the even number row. Alternatively, another color filter other than the color filter having the mosaic filter as represented in FIG. 15 may be utilized, in which the equation (1) can be satisfied, in general, in view of suppression of the Moire'. The major feature of the embodiment is such that the color signal is produced from the signals of two rows during the electronic zooming-in operation. Since the color signal is generated from the signals of four rows during the normal readout operation, the deterioration of the vertical resolution for the color signal due to the electronic zooming-in operation can be suppressed similar to that of the luminance signal.

Figure 17:
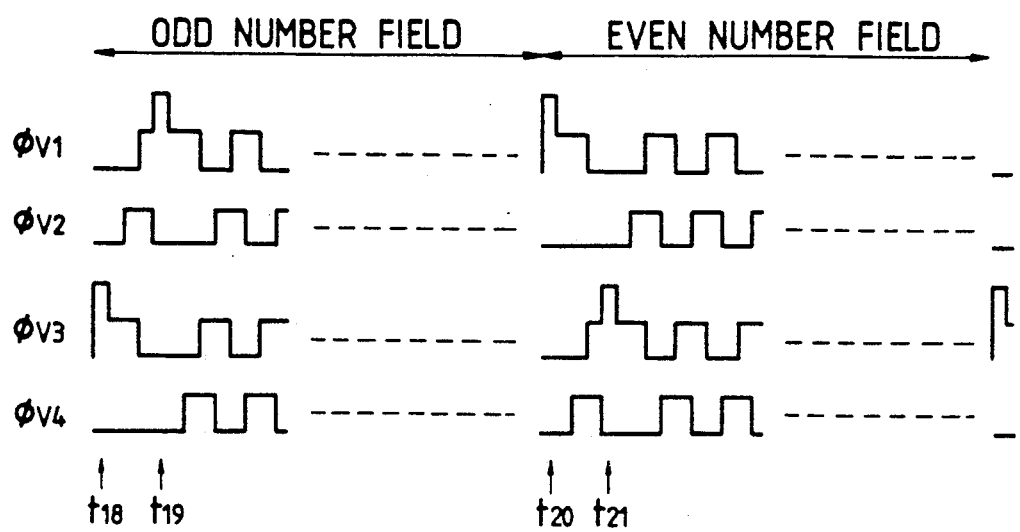
FIG. 17 is a timing chart of a driving pulse group for an image sensor employed in an image pick-up apparatus according to a still further embodiment of the present invention; namely, is a timing chart of a pulse group for driving the same sensor as that shown in FIG. 6.

There is shown an embodiment in which the line misplacement is prevented. FIG. 17 represents an example of a pulse group for driving a sensor having the same construction as that of the sensor shown in FIG. 6. In the odd number field during the normal readout operation, the signal charges accumulated in the photodiodes positioned in the even number rows are transferred to the $\phi_{V3}$ stage of the vertical CCD 17 at a time instant $t_{18}$, the signal charges are moved along the upper direction shown in FIG. 6 and transferred to the $\phi_{V1}$ stage of the vertical CCD 17. Subsequently, at a time instant $t_{19}$, the signal charges accumulated in the photodiodes positioned in the odd number rows are transferred to the $\phi_{V1}$ stage of the vertical CCD 17. Accordingly, the signal charges of the above-described odd number rows are mixed with the signal charges of the above-mentioned even number rows positioned adjacent to and beneath the odd number rows. In the odd number field, the signal charges accumulated in the photodiodes positioned at the odd number rows are transferred at time instant $t_{20}$ to the $\phi_{V1}$ stage of the vertical CCD 17, and the signal charges are transferred along the upper direction shown in FIG. 6 so as to be moved to the $\phi_{V3}$ stage. Thereafter, the signal charges accumulated in the photodiodes arranged at the even number rows are transferred to the $\phi_{V3}$ stage at a time instant $t_{21}$. As a result, the signal charges of the above-described odd number rows are mixed with the signal charges of the above-mentioned even number rows positioned adjacent to and above the odd number rows. While the electronic zooming-in operation is carried out, the sensor is driven by the driving circuit for the electronic zooming-in operation from which the sensor driving pulse as represented in either the odd number field, or even number field of FIG. 17 is produced in both fields. Thus, no signal misplacement occurs during the electronic zooming-in operation.

Figure 19:
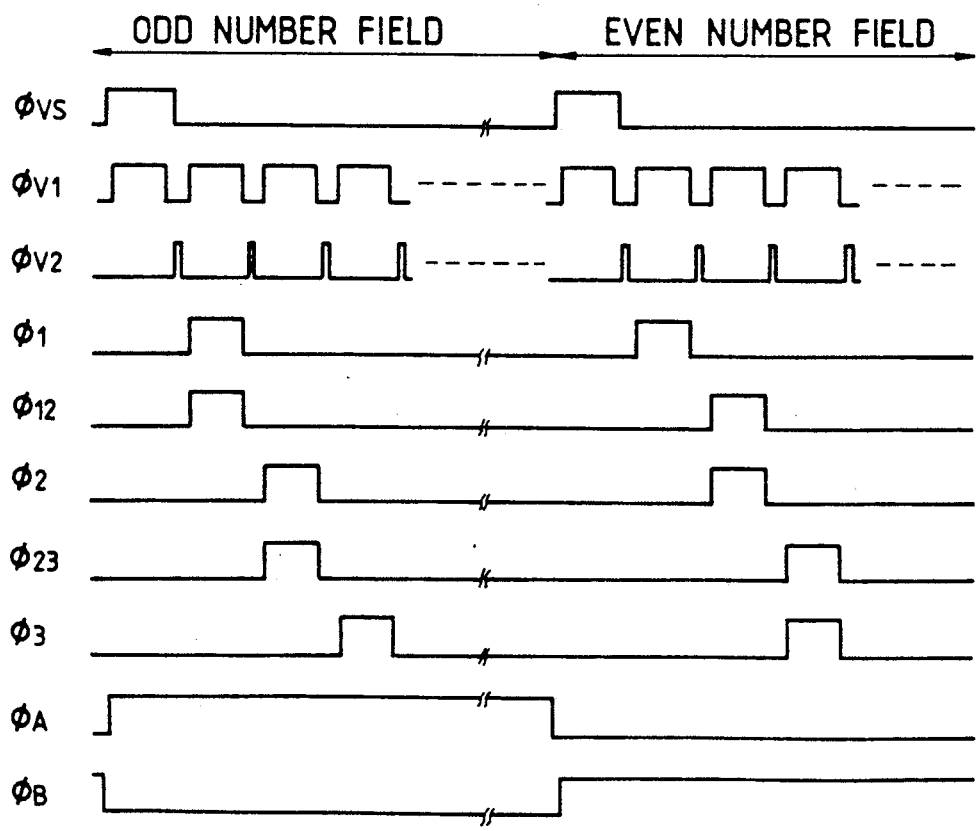
FIG. 19 is a timing chart of the pulse group for driving the image sensor shown in FIG. 18.
Figure 18:
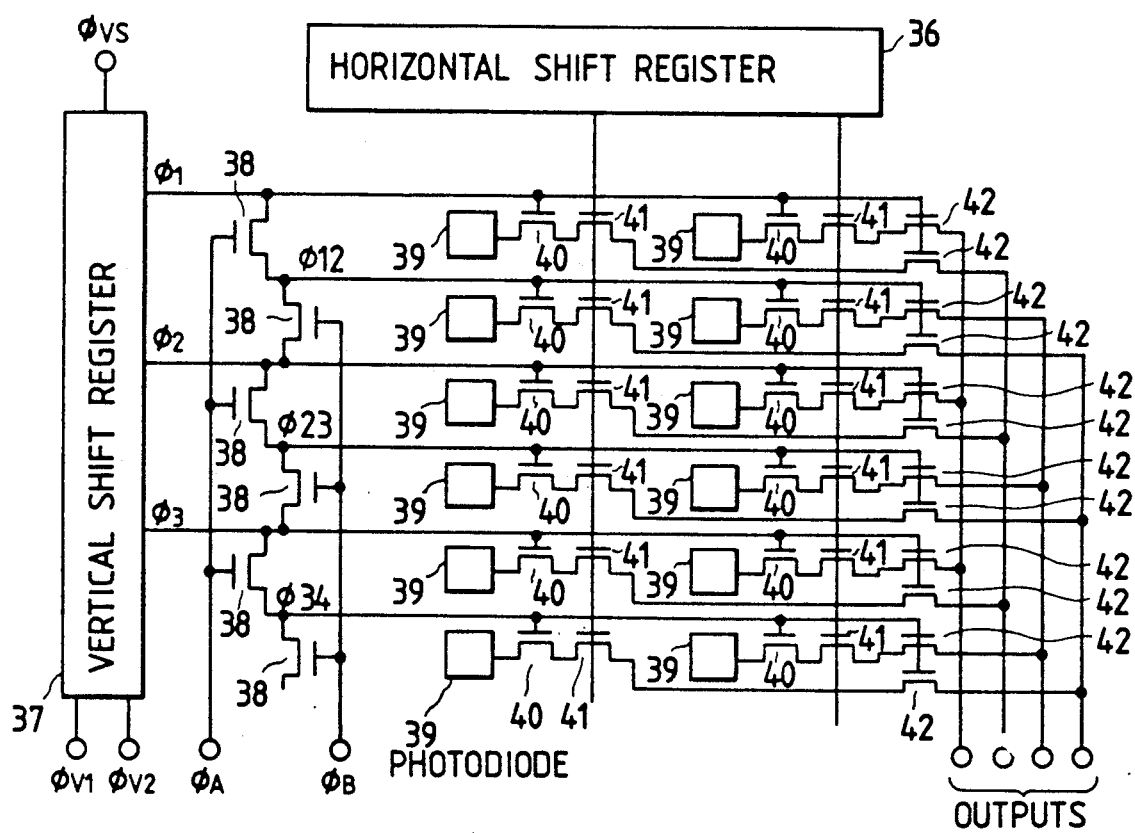
FIG. 18 is a circuit diagram of an image sensor employed in another embodiment of the present invention.

In FIG. 18, there is shown another embodiment. In FIG. 18, reference numeral 36 denotes a horizontal shift register; reference numeral 37 indicates a vertical shift register; reference numeral 38 represents a MOS switch for the interlacing readout; reference numeral 39 is a photodiode; reference numeral 40 represents a vertical MOS switch; reference numeral 41 denotes a horizontal MOS switch; and, reference numeral 42 indicates another vertical MOS switch. In FIG. 19, there is shown an example of a pulse group for driving the sensor shown in FIG. 18. Pulse $\phi_1$, $\phi_2$, - - -, are output from the vertical shift register 37 as a reference of a pulse $\phi_{V1}$ which has been surrounded by a pulse $\phi_{VS}$, and a $\phi_{i,j}$ is equal to either a $\phi_i$ or a $\phi_j$ depending upon the poralities of the signals $\phi_A$ and $\phi_B$ (i=1,2,3, - - - ; j=1,2,3, - - - ). As a result, in FIG. 19, the odd number row, for example, the third row, and the even number row, that is the forth row, which is under this third row are simultaneously selected by the MOS switches 40 to 42 in the odd number field, whereas the odd number row, that is the third row, and the even number row, that is the second row, which is above this third row are simultaneously selected in the even number field.

During the electronic zooming-in operation, the sensor is driven by the driving circuit for the electronic zooming-in operation, in which the signals $\phi_A$ and $\phi_B$ are fixed to either the low level and high level, or the high level and low level, respectively, even in the odd number field and even number field. As a consequence, no signal misplacement occurs during the electronic zooming-in operation.

It is readily conceived that such an idea that the sensor is driven by the same driving pulse group during both of the fields, and the signal readout sequence from the respective rows of the sensor is coincident with each other during both of the fields while the electronic zooming-in operation is carried out, may be applied to the above-described embodiments represented in FIGS. 5 to 16. In this case, since the signal writing sequence to the memory and the signal readout sequence from the memory can be also coincident to each other, the arrangement of the memory driving circuit may be simplified.

We claim:

1. An image pick-up apparatus comprising:
   a solid-state image sensor including a plurality of photoelectric conversion elements arranged in a two-dimensional form, and signal readout means for deriving from these photoelectric conversion elements signal charges accumulated therein and for deriving from the solid-state image sensor the signal charges as an output signal of the solid-state image sensor;
   a first driving circuit for supplying a first driving pulse group to said signal readout means in order to simultaneously read out, within the same one horizontal scanning period, the signal charges accumulated in the photoelectric conversion elements arranged in two rows adjacent to each other in a vertical direction;
   a second driving circuit for supplying a second driving pulse group to said signal readout means so as to separately read out the signal charges accumulated in the photoelectric conversion elements arranged in said two rows adjacent to each other in the vertical direction;
   a memory for storing a signal read out with the signal readout means when driven by the second driving pulse group; and
   a memory driving circuit for reading out from the memory the signal stored in said memory in a time sequence different from another time sequence at which the signal has been stored in the memory.

2. An image pick-up apparatus as claimed in claim 1, wherein said first driving circuit supplies the first driving pulse group to said signal readout means in such a manner that the pair of said two rows adjacent to each other in the vertical direction from which the signal charges are simultaneously read out are different between an odd number field and an even number field.

3. An image pick-up apparatus as claimed in claim 1, wherein when said first driving pulse group is supplied from said first driving circuit to said signal readout means, the signal charges accumulated in the photoelectric conversion elements of said two rows adjacent to each other in the vertical direction are used as one unit so as to produce a luminance signal, whereas when said second driving pulse group is supplied from said second driving circuit to said signal readout means, the signal charges accumulated in the photoelectric conversion element of one row are used as one unit so as to produce the luminance signal.

4. An image pick-up apparatus as claimed in claim 1, wherein when said first driving pulse group is supplied from said first driving circuit to said signal readout means, the signal charges accumulated in the photoelectric conversion elements of the four rows adjacent to each other in the vertical direction are used as one unit so as to produce a color signal.

5. An image pick-up apparatus as claimed in claim 1, wherein said second driving circuit supplies said second driving pulse group to said signal readout means in such a manner that the signal charges accumulated in the photoelectric conversion elements of one group of odd number rows and even number rows are output from said solid-state image sensor by said signal readout means, and thereafter the signal charges accumulated in the photoelectric conversion elements of another group of said odd number rows and said even number rows are output from said solid-state image sensor by said signal readout means.

6. An image pick-up apparatus as claimed in claim 1, wherein said second driving circuit supplies said second driving pulse group to said signal readout means in such a manner that both the signal charges accumulated in the photoelectric conversion elements of an odd number row, and also the signal charges accumulated in the photoelectric conversion elements of an even number row are alternately output from said solid-state image sensor by said signal readout means.

7. An image pick-up apparatus as claimed in claim 1, wherein the signal charges accumulated in a part of the plural photoelectric conversion elements arranged in said solid-state image sensor are discharged via a path different from said signal readout means, from said solid-state image sensor.

8. An image pick-up apparatus as claimed in claim 1, wherein when said second driving pulse group is supplied from said second driving circuit to said signal readout means, only signals corresponding to the signal charges which have been accumulated in the photoelectric conversion elements existing within a predetermined portion said two-dimensional form, among said plurality of photoelectric conversion elements arranged in said two-dimensional form of said solid-state image sensor, are read out from said memory so as to form a signal corresponding to an overall region of a screen of a television.

9. An image pick-up apparatus as claimed in claim 8, wherein said predetermined portion of said two-dimensional form is comprised of a half of all rows and half of all columns of the photoelectric conversion elements arranged in the horizontal and vertical directions.

10. An image pick-up apparatus according to claim 1, wherein said signal readout means includes a parallel-to-serial CCD shift register arrangement.

11. An image pick-up apparatus comprising:
    a solid-state image sensor including a plurality of photoelectric conversion elements arranged in a two-dimensional form, and signal readout means for deriving from these photoelectric conversion elements signal charges accumulated therein and for deriving from the solid-state image sensor the signal charges as an output signal of the solid-state imaging sensor;
    a first driving circuit for supplying a first driving pulse group to said signal readout means so a to read out the signal charges accumulated in the photoelectric conversion elements at different time sequences with respect to each other in an odd number field and an even number field;
    a second driving circuit for supplying a second driving pulse group to said signal readout means so as to read out the signal charges accumulated in the photoelectric conversion elements at an identical time sequence in both he odd number field and even number field;
    a memory for storing a signal read out with the signal readout means when driven by the second driving pulse group; and
    a memory driving circuit for reading out the signal stored in said memory in such a manner that the stored signal corresponding to each horizontal scanning line is read out at least twice in one field.

12. An image pick-up apparatus as claimed in claim 11, wherein said first driving circuit supplies said first driving pulse group to said signal readout means in such a manner that the signal charges accumulated in the photoelectric conversion elements of two rows adjacent to each other in a vertical direction are simultaneously read out within the same one horizontal scanning period, and also the pair of said two rows adjacent to each other in the vertical direction from which the signal charges are simultaneously read out are different between an odd number field and an even number field.

13. An image pick-up apparatus as claimed in claim 11, wherein when said first driving pulse group is supplied from said first driving circuit to said signal readout means, the signal charges accumulated in the photoelectric conversion elements of said two rows adjacent to each other in the vertical direction are used as one unit so as to produce a luminance signal, whereas when said second driving pulse group is supplied from said second driving circuit to said signal readout means, the signal charges accumulated in the photoelectric conversion element of one row are used as one unit so as to produce the luminance signal.

14. An image pick-up apparatus as claimed in claim 11, wherein when said first driving pulse group is supplied from said first driving circuit to said signal readout means, the signal charges accumulated in the photoelectric conversion elements of the four rows adjacent to each other in the vertical direction are used as one unit in order to produce a color signal, whereas when said second driving pulse group is supplied from said second driving circuit to said signal readout means, the signal charges accumulated in the photoelectric conversion elements of the two rows adjacent to each other in the vertical direction are used as one unit so as to produce the color signal.

15. An image pick-up apparatus as claimed in claim 11, wherein said second driving circuit supplies said second driving pulse group to said signal readout means in such a manner that the signal charges accumulated in the photoelectric conversion elements of one group of odd number rows and even number rows are output from said solid-state image sensor by said signal readout means, and thereafter the signal charges accumulated in the photoelectric conversion elements of another group of said odd number rows and said even number rows are output from said solid-state image sensor by said signal readout means.

16. An image pick-up apparatus as claimed in claim 11, wherein said second driving circuit supplies said second driving pulse group to said signal readout means in such a manner that both the signal charges accumulated in the photoelectric conversion elements of an odd number row, and also the signal charges accumulated in the photoelectric conversion elements of an even number row are alternately output from said solid-state image sensor by said signal readout means.

17. An image pick-up apparatus as claimed in claim 11, wherein the signal charges accumulated in a part of the plural photoelectric conversion elements arranged in said solid-state image sensor are discharged via a path different from said signal readout means, from said solid-state image sensor.

18. An image pick-up apparatus according to claim 11 wherein said signal readout means includes a parallel-to-serial CCD shift register arrangement.

19. An image pick-up apparatus as claimed in claim 11, wherein when said second driving pulse group is supplied from said second driving circuit to said signal readout means, only signals corresponding to the signal charges which have been accumulated in the photoelectric conversion elements existing within a predetermined portion of said two-dimensional form, among said plurality of photoelectric conversion elements arrange din said two-dimensional form of said solid-state image sensor, are read out from said memory so as to form a signal corresponding to an overall region of a screen of a television.

20. An image pick-up apparatus as claimed in claim 19, wherein said predetermined portion of said two-dimensional form is comprised of a half of all rows and a half of all columns of the photoelectric conversion elements arranged in the horizontal and vertical directions.

* * * * *